United States Patent [19]
Uloth

[11] Patent Number: 5,947,551
[45] Date of Patent: Sep. 7, 1999

[54] GAP COVERING MEMBER FOR PICKUP TRUCK

[76] Inventor: Mark Uloth, Rte. 1, Box 552, Walnut Springs, Tex. 76690

[21] Appl. No.: 09/212,005

[22] Filed: Dec. 15, 1998

[51] Int. Cl.⁶ .................................................. B62D 24/00
[52] U.S. Cl. ........................................... 296/198; 280/848
[58] Field of Search ............................ 296/198; 280/847, 280/848, 153.5, 851

[56] References Cited

U.S. PATENT DOCUMENTS 2,416,798  3/1947  Ferguson .............................. 280/153.5
2,483,622  10/1949  Burski .................................. 280/153.5

*Primary Examiner*—Gary C. Hoge
*Attorney, Agent, or Firm*—Arthur F Zobal

[57] ABSTRACT

U-shaped members are provided for covering the gaps formed at the rear of a pickup truck and as seen in the rear wheel wells between the frame and side walls of the rear bed. Each U-shaped member has a central flattened portion and two flattened end portions with apertures formed therethrough for receiving threaded fasteners for attachment purposes.

6 Claims, 4 Drawing Sheets

GAP COVERING MEMBER FOR PICKUP TRUCK

BACKGROUND OF THE INVENTION

1. Field of the Invention

The invention relates to members for covering gaps found at the rear of certain pickup trucks.

2. Description of the Prior Art

CHEVROLET and GMC from 1988 to the present (including newly redesigned 1999 models) produced ½ and ¾ ton wide bed, short and long wheel base, pickup trucks that have gaps between the rear frame and the lower end of the rear bed which are visible by way of the rear wheel wells. Although the gaps do not cause any problems, the looks of the pickup trucks can be improved if these gaps are not visible.

SUMMARY OF THE INVENTION

It is an object of the invention to provide new and useful cover members for covering the gaps formed between the rear frame and bed of a pickup.

The cover members each comprise a U-shaped member having central portion for attachment to the side wall of a wheel well and two end portions which extend transversely from the central portion for attachment to the front and rear walls of the wheel well.

In the embodiment disclosed, the central and end portions of the U-shaped members are flattened portions having apertures formed therethrough for receiving attachment means for attachment purposes.

DESCRIPTION OF THE PREFERRED EMBODIMENTS

Figure 1:
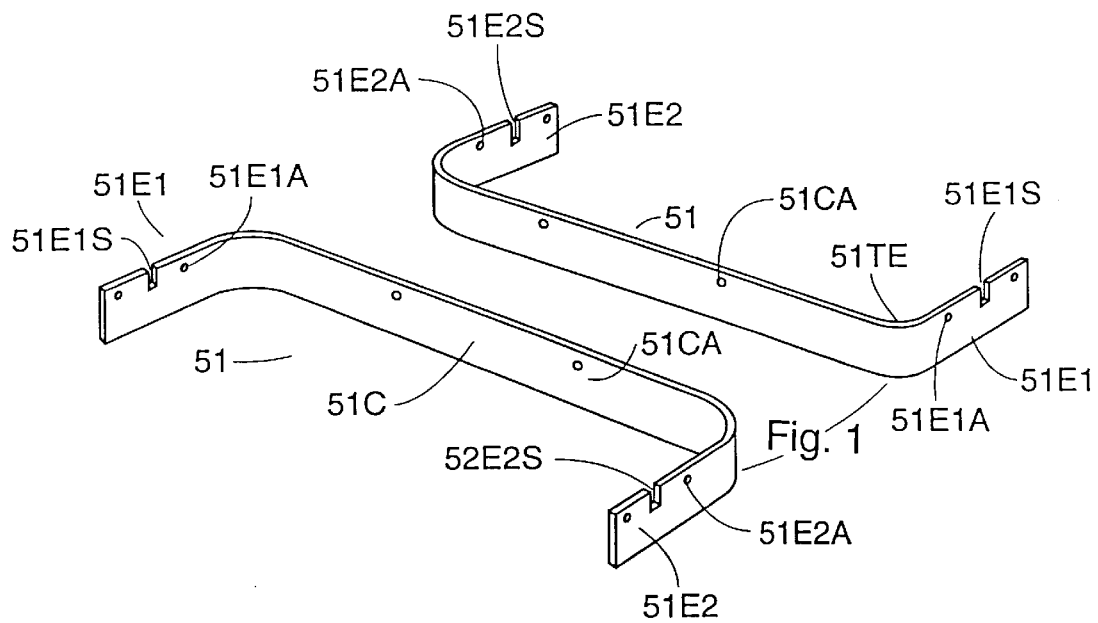
FIG. 1 is an isometric view of a pair of cover members of the invention.

Referring now to FIGS. 2–7 of the drawings, there is illustrated the rear side view of a pickup truck 21 having a wheel 23 supported in a wheel well 25 or inner fender extension below the fender 27. The wheel well is formed by the lower side wall 29 of the bed 31, rear frame 33 of the pickup truck, a front wall 35 and a rear wall 37. The wheel and wheel well on the opposite side of the pickup truck is a mirror image of FIG. 3 such that a gap 41 is formed between the side wall 29 and the frame 33 which is visible from both sides such that a person on one side of the pickup truck can see through the gap 41.

Referring also to FIG. 1 there is provided two identical metal cover members 51 for covering the gaps 41 on the left and right sides of the pickup truck. Either cover member 51 can be used on either side of the pickup truck. Each cover member 51 is U-shaped and comprises a flattened central portion 51C and two flattened end portions 51E1 and 51E2 extending transversely from the central portion 51C. The cover member 51 has apertures 51CA, 51E1A and 51E2A formed through the portions 51C, 51E1 and 51E2 near the top edges 51TE thereof and slots 51E1S and 51E2S extending from the top edges of end portions 51E1 and 51E2 respectively.

Figure 6:
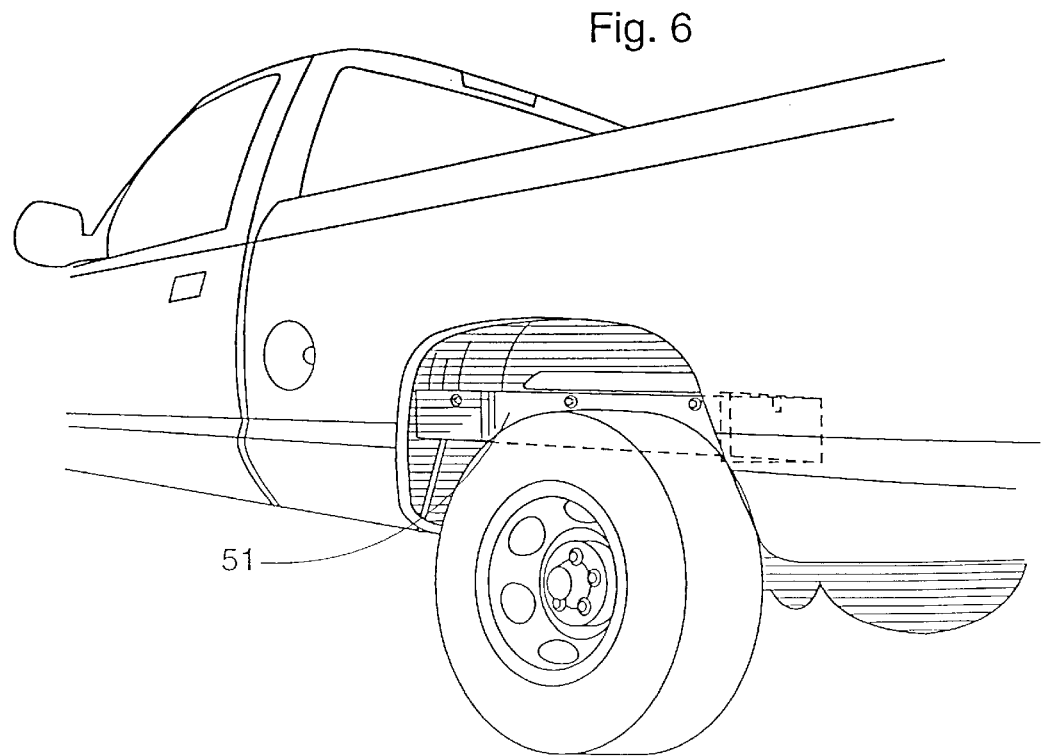
FIGS. 5 and 6 are views similar to that of FIG. 4 with a cover member installed.
Figure 2:
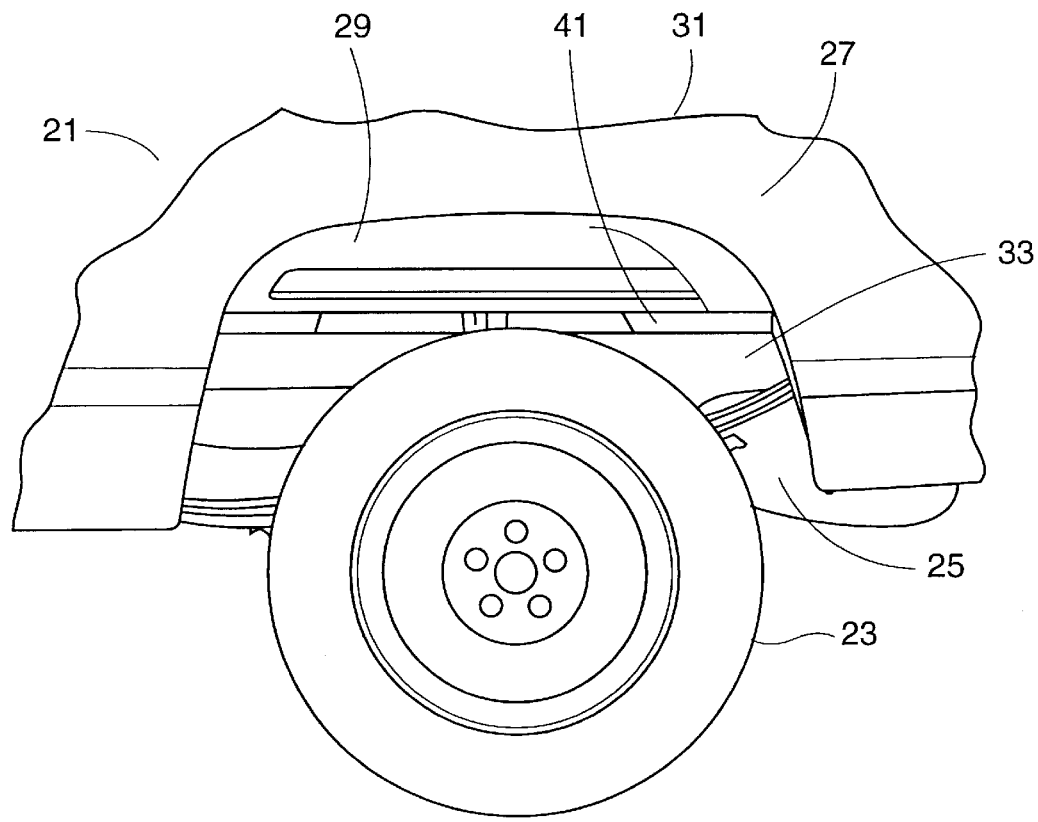
FIG. 2 is a side view of a rear wheel and wheel well of a pickup truck illustrating a gap formed between the rear frame and the bed or the side wall of the wheel well.
Figure 3:
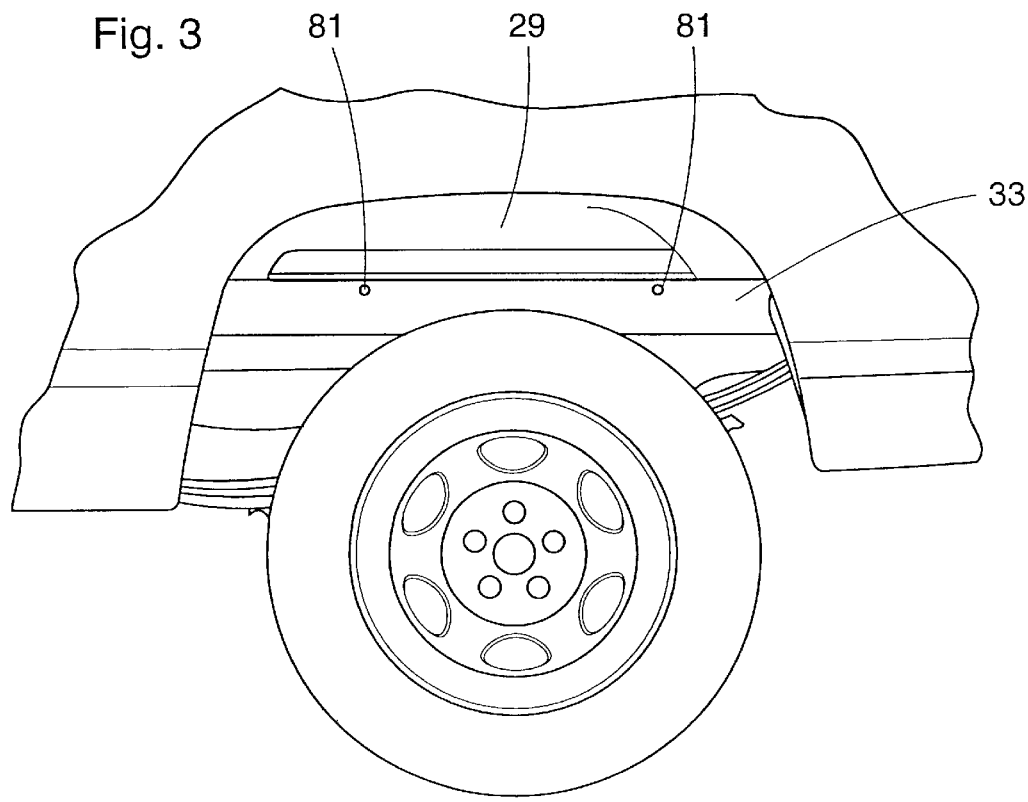
FIG. 3 is a view of a rear wheel and wheel well of a pickup truck similar to that of FIG. 2 showing one the of cover members of FIG. 1 installed.
Figure 4:
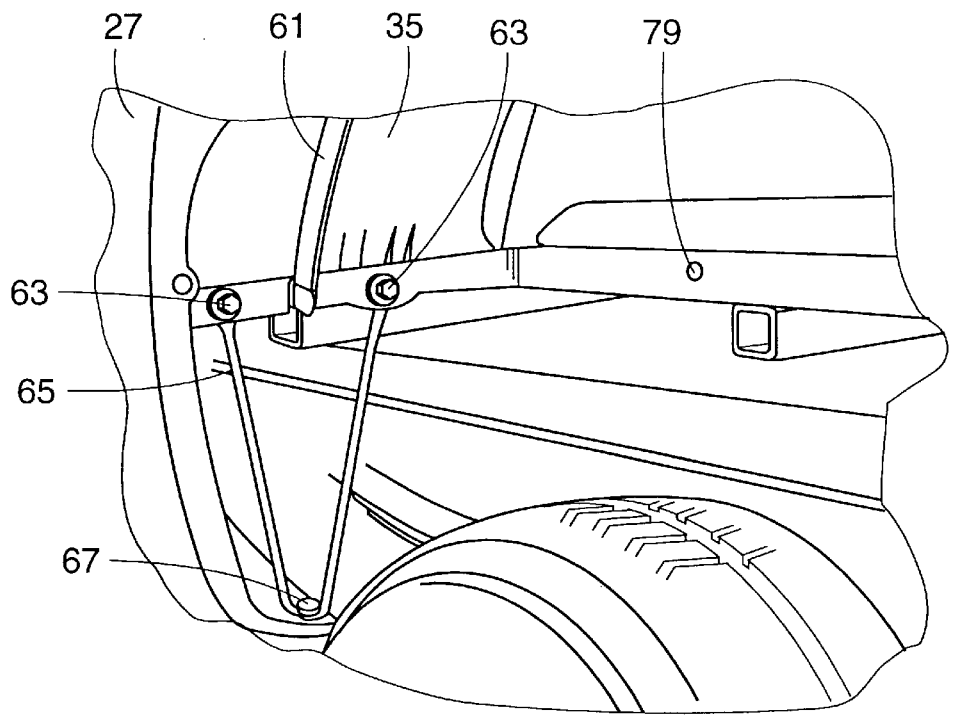
FIG. 4 is a view of the wheel and wheel wall of FIG. 2 as seen from the rear looking forward before a cover member is installed.
Figure 5:
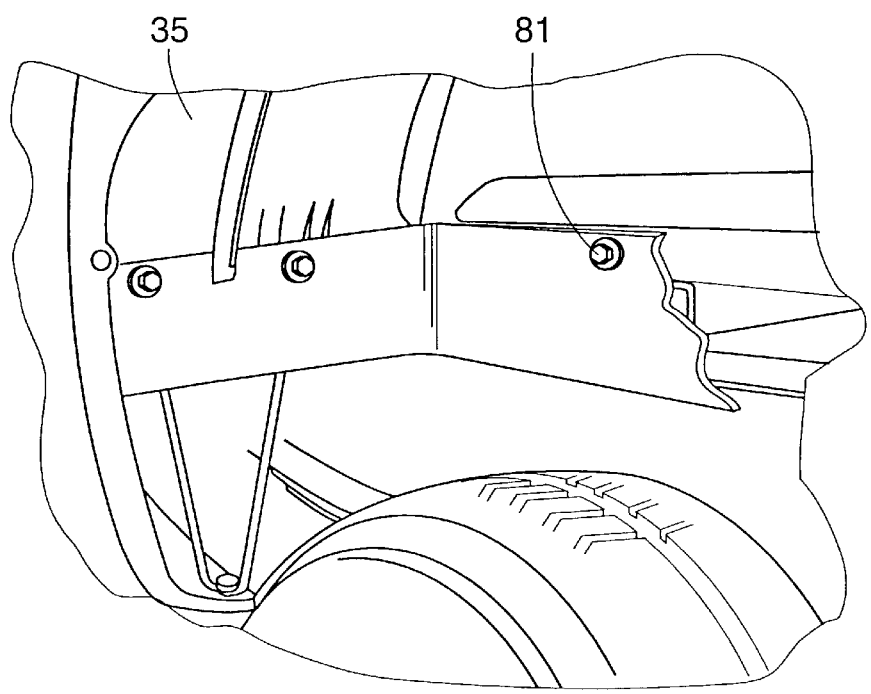
Figure 7:
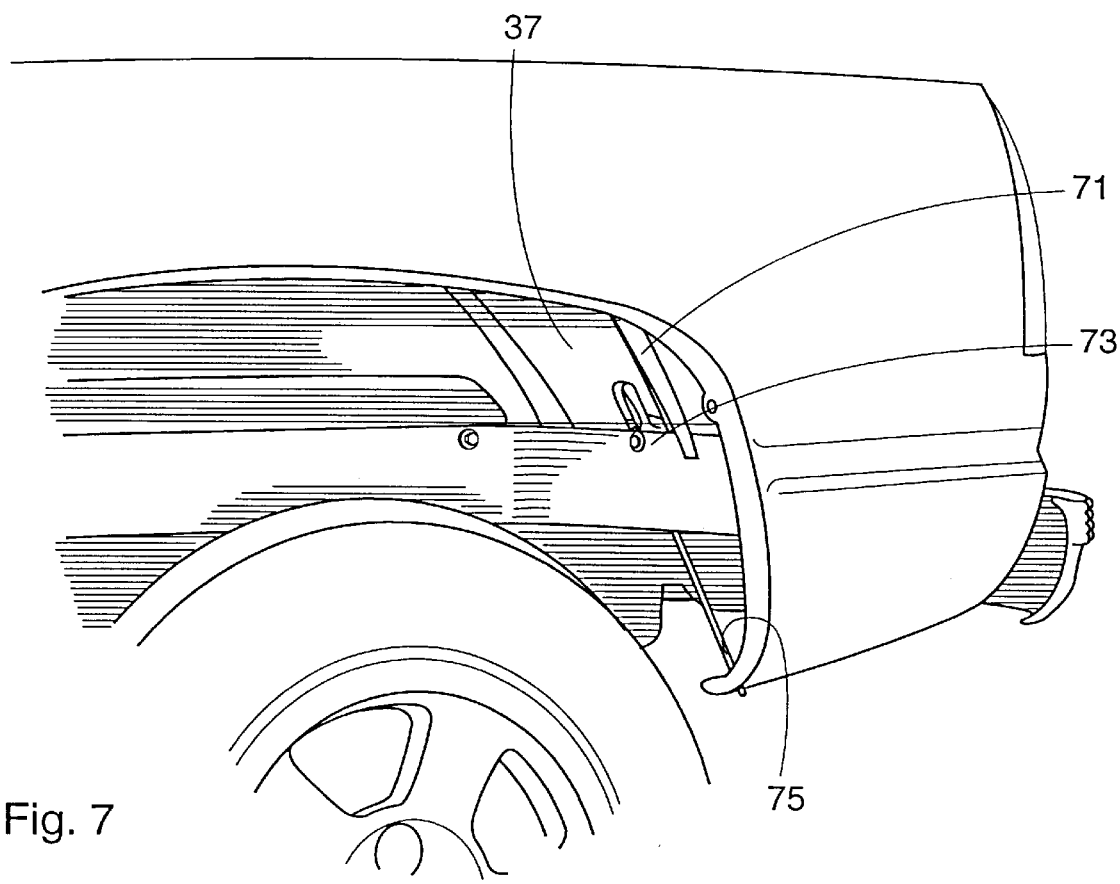
FIG. 7 is a view of the wheel and wheel well of FIGS. 2–6 looking rearward with a cover member installed.

Referring to FIGS. 4 and 6, the front wall 35 of the left rear wheel well has a stiffening ridge 61 and two apertures (not shown) for receiving two bolts 63 for attaching the upper ends of a V-shaped support 65 to the wall. The lower end of the support 65 is attached to the lower inner edge of the fender 27 by a bolt 67. Referring to FIG. 7, the rear wall 37 of the left wheel well has a stiffening ridge 71 and a single aperture (not shown) for receiving a bolt 73 for attaching the upper end of a support rod 75 to the wall. The lower end of the support rod 75 is attached to the lower inner edge of the fender 27 by a bolt 77. The right rear wheel well is constructed in a manner similar to that of the left rear wheel well.

A cover member 51 is attached to cover the gap 41 in the left rear wheel well by forming two holes (one of which is shown at 79 in FIG. 4) through the side wall 29 and removing the bolts 63 and 73. The cover member 51 then is attached in place by fitting the ridges 61 and 71 in the slot 51E1S and 51E2S of cover member portions 51E1 and 51E2. The bolts 63 are inserted through the apertures 51E1A, through the apertures formed through the upper ends of the V-shaped member 65 and screwed into the wall 35. The bolts 73 are inserted through the inner aperture 51E2A of the cover member portion 51E2, through the aperture formed through the upper end of the rod 75 and screwed into the wall 37. Bolts 81 are inserted through apertures 51CA of the cover member portion 51C and screwed into the aperture 79. The bolts 81 may be self-tapping such that it is not necessary to preform the apertures 79.

The other cover member 51 is turned around as shown in FIG. 1 and attached to the walls forming the rear right wheel well in a similar manner to cover the gap on the other side of the pickup truck.

In one embodiment, each of the cover members may have a central portion 51C with a length of 35 inches, end portions 51E1 and 51E2 each with a length of 12 ½ inches. The height of each of the cover members may be 3 inches.

What is claimed is:

1. A cover member for covering a gap formed between the rear frame and truck bed of a pickup truck inline with the rear wheel wells, each of which is of the type having a side wall above said gap, a front wall and a rear wall, comprising:

a U-shaped member having a central portion for attachment to said side wall for covering said gap, and two end portions which extend transversely from said central portion for attachment to said front wall and to said rear wall respectively.

2. The cover member of claim 1, comprising:

apertures formed through said central portion and through said two end walls for receiving fastening means for attachment of said central portion and said two end portions to said side wall, and to said front and rear walls respectively.

3. The cover member of claim 1 wherein:

said central portion and said two end portions comprise flattened portions.

4. The cover member of claim 2, wherein:

said central portion and said two end portions comprise flattened portions.

5. A pickup truck comprising:

a rear frame for supporting a truck bed and a rear wheel located in a rear wheel well on each side of said truck with each rear wheel well comprising a side wall, a front wall, and a rear wall, each of said side walls being located above said frame on each side of said pickup truck such that a gap is formed between said rear frame and said side walls, a U-shaped member attached to said pickup truck on each side thereof for covering said gap, each of said U-shaped members comprising a central portion and two end portions extending transversely from said central portion attached to said side wall and to said front and rear walls respectively of one each of said sides of said pickup truck.

6. The pickup truck of claim 5, wherein:

each of said U-shaped members comprises a flattened central portion and two flattened end portions with apertures extending therethrough and attached to its said associated side wall, front wall, and rear wall respectively with fasteners extending through said apertures.

\* \* \* \* \*